United States Patent [19]

Buma et al.

[11] Patent Number: 4,836,575
[45] Date of Patent: Jun. 6, 1989

[54] VEHICLE FLUID SUSPENSION CIRCUIT

[75] Inventors: Shuuichi Buma; Nobutaka Ohwa, both of Toyota; Osamu Takeda, Susono; Hajime Kamimae, Toyota, all of Japan

[73] Assignee: Toyota Jidosha Kabushiki Kaisha, Aichi, Japan

[21] Appl. No.: 172,801

[22] Filed: Mar. 28, 1988

[30] Foreign Application Priority Data

Mar. 30, 1987 [JP] Japan ............................. 62-47456[U]

[51] Int. Cl.⁴ ........................ B60G 11/30; B60G 19/04
[52] U.S. Cl. .................................... 280/702; 280/6.12
[58] Field of Search ............... 280/707, 714, 702, 711, 280/DIG. 1, 6 R

[56] References Cited

U.S. PATENT DOCUMENTS

| 3,121,573 | 2/1964 | Alfieri et al. | 280/DIG. 1 |
| 4,625,994 | 12/1986 | Tanaka et al. | 280/707 |
| 4,695,074 | 9/1987 | Kobayashi et al. | 280/707 |

FOREIGN PATENT DOCUMENTS

| 60-119623 | 8/1985 | Japan . | |
| 2155207 | 9/1985 | United Kingdom | 280/707 |

Primary Examiner—Charles A. Marmor
Assistant Examiner—Karin Tyson
Attorney, Agent, or Firm—Oliff & Berridge

[57] ABSTRACT

A vehicle fluid suspension circuit comprising fluid sources provided to the front and rear sides of a vehicle, front and rear side paths connecting the front and rear side fluid sources and fluid suspensions of right and left wheels of the respective sides and providing valves between the resepective fluid sources and fluid suspensions of respective wheels and a front-to-rear path having an effective sectional area which is smaller than the effective sectional areas of the front side path and rear side path, respectively, and connecting the front side fluid source with the rear side fluid source.

5 Claims, 1 Drawing Sheet

VEHICLE FLUID SUSPENSION CIRCUIT

FIELD OF THE INVENTION

The present invention relates to a fluid suspension circuit utilizing a fluid such as air for vehicle suspension.

BACKGROUND OF THE INVENTION

A fluid suspension is often used for realizing sophisticated suspension control in concatenation with an electronic control device because it is comparatively easier to change the suspension characteristics.

Such control usually includes adjustment of a vehicle body height, which is increased a desired amount by supplying a predetermined amount of fluid into a fluid suspension chamber of each wheel from a fluid source, while it is lowered a desired amount by removing a predetermined amount of fluid from the fluid chamber.

An example of structure and function for adjustment of body height by such a fluid suspension is disclosed in the Japanese Laid-open Patent No. 119623/1985. The vehicle fluid suspension circuit of the prior art usually employs the structure indicated in this patent, comprising fluid sources provided to the front and rear sides of vehicle, a suspension system having a fluid chamber provided to each wheel, a pipe connecting the fluid sources with each fluid chamber, and valves provided immediately before the fluid chamber of each pipe.

Adjustment of body height is intended to set the body height at a desired value and also to keep the body horizontal. If the fluid chamber valves of respective wheels are opened simultaneously as in the circuit structure of the prior art, in order to simultaneously supply fluid from a fluid source into the fluid chambers in the suspension system of each wheel in order to realize adjustment of body height as quickly as possible, the fluid chambers are also opened to each other. Since the respective loads applied on each wheel are generally not equal, the attitude of vehicle is unbalanced.

Therefore, integrated adjustment of a vehicle's body height while keeping the vehicle horizontal inevitably involves sequentially adjusting all wheels by varying the time during when each wheel's fluid chamber valve is opened, connecting only one fluid chamber at a time to the fluid source, and gradually increasing (or lowering) the body height at each wheel. However, this method results in a problem that a longer time is required to adjust body height.

On the other hand, there is no large difference of load distribution between the right and left sides of the vehicle compared to that between the front and rear sides, depending on the location of the engine. This suggests a method to adjust body height by dividing the circuit into two systems—one for the front wheels and one for the rear wheels. Namely, adjustment of body height is carried out separately for the front and rear wheels by providing a valve in the circuit path between the front wheels and the rear wheels side. This method has an advantage that the adjustment time is halved.

However, this method still contains the problems that the body height adjusting speed is lower than that of the simultaneous body height adjustment for all wheels, and that structure and control are complicated by the valve and the total weight is more.

SUMMARY OF THE INVENTION

An object of this invention is to provide a vehicle fluid suspension circuit is which the body height of a vehicle is quickly adjusted by a light fluid circuit and a simple control system.

Another object of this invention is to provide a vehicle fluid suspension circuit in which a body height difference between vehicle's front and rear side is minimized quickly even if there is a difference in load distribution between the front and rear wheels of the vehicle.

Another object of this invention is to provide a vehicle fluid suspension circuit in which the body height of the vehicle can be adjusted by either high pressure fluid sources which are respectively disposed on front and rear side reservoir systems.

The foregoing and other objects will be attained by a vehicle fluid suspension circuit comprising: fluid sources disposed respectively at front and rear sides of a vehicle; fluid passages disposed respectively at front and rear sides of said vehicle, said fluid passages connecting said fluid sources to fluid suspensions of left and right wheels at front and rear sides of said vehicle and having valves between said respective fluid sources and said respective fluid suspensions; and front-to-rear passages connecting said fluid sources at front side of said vehicle to said fluid sources at rear side of said vehicle, effective sectional areas of said front-to-rear passages being smaller than those of said fluid passages at front and rear sides of said vehicle.

DETAILED DESCRIPTION OF THE INVENTION

Figure 1:
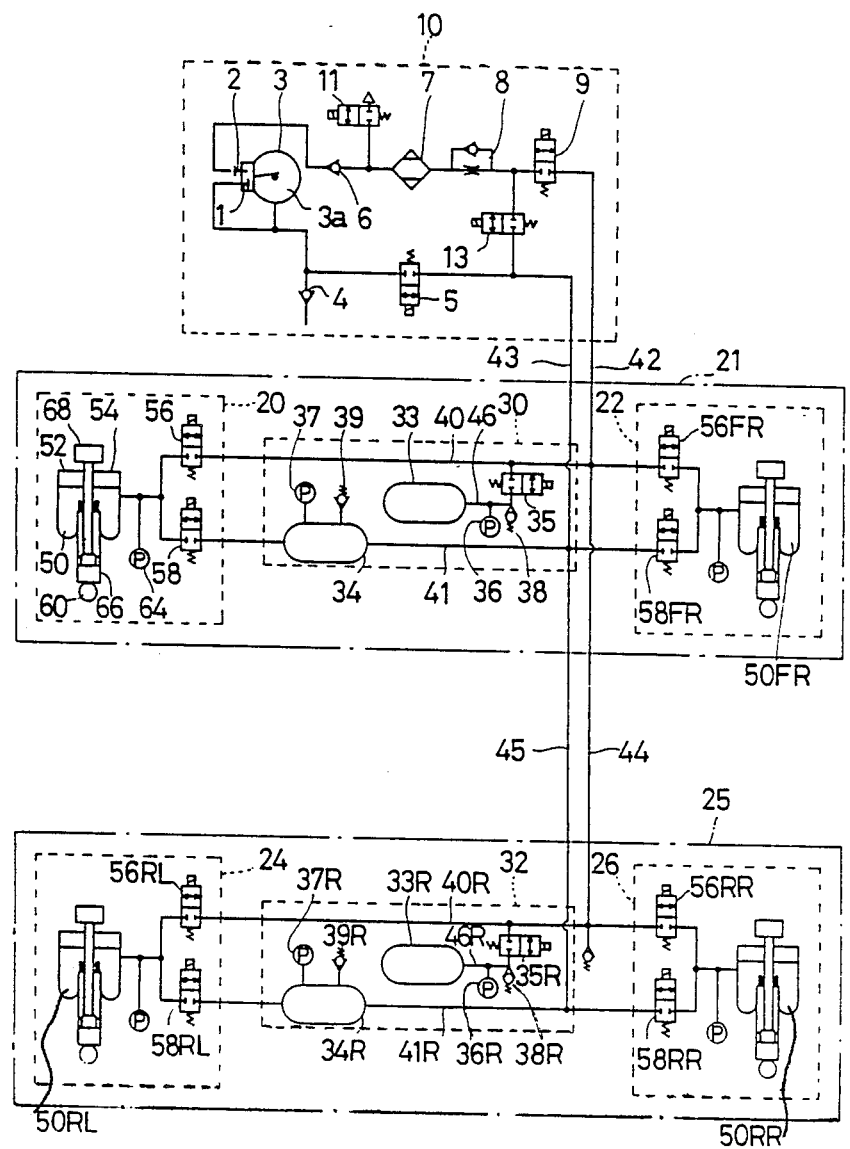
FIG. 1 is a circuit diagram of an air suspension system of vehicle as an embodiment of the present invention.

An example of adapting the present invention to an air suspension system of vehicle is explained hereunder. The system of the present invention can be divided into a compressed air supply exhaust system 10, suspension systems 20, 22, 24, 26 for respective wheels, and reservoir systems 30, 32 including high and low pressure reservoir tanks. The four suspension systems are classified: the left and right suspension system 20, 22 constitute the front wheels system 21, and the left and right suspension system 24, 26 constitute the rear wheels system 25, and the reservoir systems 30, 32 are provided to respective systems 21, 25.

The left and right suspension systems 20, 22 for the front wheels are interconnected by a supply pipe 40 and an exhaust pipe 41. The left and right suspension systems 24, 26 of rear wheels are also interconnected by a supply pipe 40R and an exhaust pipe 41R.

A supply pipe 42 and an exhaust pipe 43 connect the compressed air supply exhaust system 10 with supply pipe 40 and exhaust pipe 41 of the front wheel system 21. Moreover, a supply pipe 44 and an exhaust pipe 45 connect the front wheels system 21 with the rear wheels system 25.

A pump 3 having a suction port 1 and an exhaust port 2 is provided to the compressed air supply exhaust system 10. The suction port 1 of pump 3 is opened to the atmospheric air through the non-return valve 4, and the exhaust pipe 43 is connected between the suction port 1 and non-return valve 4 through a flow control return valve 5. The pipe connected to the suction port 1 is branched to also connect to the lower chamber 3a of a piston within pump 3 for the purpose of alleviating a torque load when starting and during operation of pump 3.

The exhaust port 2 of pump 3 is connected with the supply pipe 42 through a non-return valve 6, an air dryer 7, a one-way throttle valve 8 and a flow control main valve 9. An exhaust valve 11 opened to atmospheric air is provided between the non-return valve 6 and a air dryer 7 in the supply side. The exhaust pipe 43 is also connected between the one-way throttle valve 8 and flow control main valve 9 in the supply side through a flow control bypass valve 13.

Since the reservoir systems 30, 32 have the same structure, explanation will be made only to the reservoir system 30 of the front wheels system 21. The reservoir system 30 is provided with a high pressure reservoir tank 33 and a low pressure reservoir tank 34. The high pressure reservoir tank 33 is connected through a pressure pipe 46 and a front reservoir high pressure valve 35 with the supply pipe 40 which connects the suspension systems 20 and 22 of the left and right front wheels. The low pressure reservoir tank 34 is directly provided at an intermediate section of exhaust pipe 41 which connects the right and left suspension systems 20, 22. Tanks 33, 34 are provided with respective pressure sensors 36, 37 and respective relief valves 38, 39. For the convenience of explanation, the elements corresponding to the reservoir system 32 and pipe of the rear wheels system are indicated by the element numbers of front wheels system plus a letter R.

Since the structure and function of the suspension system are the same for each wheel, only the suspension system 20 of the left front wheel is explained here. The suspension system 20 comprises an air suspension body 54 having an air chamber 50, a leveling valve 56 inserted in the supply pipe 40 and a discharge valve 58 inserted in the exhaust pipe 41. The supply pipe 40 and exhaust pipe 41 join immediately before the air chamber 50 of air suspension body 54 and a pressure sensor 64 is provided at such joint. Since the air suspension body 54 is further provided with a shock absorber 66 which, in addition to air chamber 50, can vary a damping force, which has an acutator 68 in order to vary a damping force. The air suspension body 54 is fixed to both the vehicle body (not illustrated) at the upper part 52 of the air chamber 50 and to a suspension arm (not illustrated) at the lower part 60 of the shock absorber 66. For the convenience of explanation, the letters FR, RL, RR are attached to the element numbers in each corresponding system of the right front suspension system 22, left rear suspension system 24 and right rear suspension system 26.

In above air pressure circuit, the front and rear high pressure reservoir tanks 33, 33R and low pressure reservoir tanks 34, 34R correspond to the front and rear fluid sources of the present invention. The supply pipe 40 extends to the air chamber 50 of left front air suspension body 54 and to the air chamber 50FR of right front air suspension body 54FR from the high pressure reservoir tank 33 in the front side and the exhaust pipe 41 extends to the air chamber 50 of left front air suspension body 54 and to the air chamber 50FR of right front air suspension body 54FR from the low pressure reservoir tank 34. Consisting the front side path. The rear side path may be defined similarly. The supply pipe 44 and exhaust pipe 45 between the front and rear side correspond to the front-to-rear path.

The effective sectional area $S_e$ of the front side path, for example, of the path extending to the air chamber 50 of air suspension body 54 from the high pressure reservoir tank 33 of front wheel, can be obtained from the expression a(1), where the effective sectional area determined by lengths and diameters of pipes, diameters of valves, etc. is defined as $S_i (i=1, \ldots n;$ n is a number of elements).

$$1/S_e^2 = \sum_{i=1}^{n} (1/S_i^2) \qquad (1)$$

If the effective sectional area of supply and exhaust pipes 44, 45, is set up as $S_{fr}$ in the system of the present invention, the following relationship can be established according to the subject matter of the present invention.

$$S_e > S_{fr} \qquad (2)$$

Usually, it is desirable that following relationship can be established.

$$S_e \gg S_{fr} \qquad (3)$$

The earlier explanation concerns the air pressure relation and therefore an electrical circuit will be described hereunder. Each pressure sensor is connected with an electronic control device (not illustrated). Pressure signals for each tank and air chamber are input to the electronic control device. Each wheel is provided with a body height sensor (not illustrated). A body height value for each respective wheel is input to the electronic control device in the same way. Each valve mentioned above is formed by a 2-position electromagnetic valve and this valve is usually held in a closed position by a spring as indicated in FIG. 1 but it is then set in an open position by a drive current sent from the electronic control device.

The electronic control device conducts calculation depending on the loaded program for adjustment of body height and vehicle attitude based on the input signals received from pressure sensors, body height sensors and other sensors, in order to calculate the amount of air to be supplied to the air chamber of each wheel and to be bled from the air chamber. The electronic control device supplies a drive current to the relevant 2-position electromagnetic valve on the basis of the value thus calculated on order to execute adjustment of body height and vehicle attitude control. In the case of vehicle attitude control, a damping force of shock absorber 66 is also varied.

Operations of the systems among the portions of the present invention when body height is increased are explained. When it is decided that the overall body height is low by a certain value based on the signals sent from the body height sensors provided to respective wheels, the electronic control device starts executing a predetermined routine to control the means for returning the body height to the initial condition as explained hereunder.

First, reduction of body height in the front and rear portions of vehicle is separately calculated from mean values of signals received from the right and left body height sensors of the front and rear sides. Required amounts of air to be supplied to the right and left air chambers of the front and rear sides in order to compensate for the amount of lost air are calculated. Based on the amount of air, the time for holding each valve open, for example, the front reservoir high pressure valve 35, left front leveling valve 56 and right front leveling valve 56FR in the case of front wheels system 21 is calculated and an excitation current is applied to a solenoid of each valve during such time. Similar operations are also carried out for the rear wheels system. Thereby, reduction of body height can be compensated for the front and rear sides of vehicle separately.

In this case, the air flows through the front-to-rear supply pipe 44 to the side with a smaller load from the side with the larger load, for example, to the rear wheels side from the front wheels side if the front wheels side is heavier. However, since the effective sectional area $S_{fr}$ of path 44 is smaller than the effective sectional area $S_e$ of the paths 40, 40R to the air chamber as indicated by the expressions (2) or (3), the amount of air flowing between the front and rear sides is very small, and therefore it does not affect the overall change of vehicle's attitude. Accordingly, the total adjustment of body height can be realized quickly while the attitude of vehicle is kept constant without relation to load distribution. This advantageous method reduces weight and simplifies control in comparison with the method of providing valves to the front-to-rear paths 44, 45.

Here, an open loop control for adjusting body height has been described, but it is certainly possible to carry out feedback control with the output signals of respective body height sensors. After the predetermined period, the valves are set in the OFF position completing the adjustment of body height.

Operations for reducing the body height are also similar to those explained above. The air is bled into the low pressure reservoir tanks 34, 34R from the air chambers 50, 50FR, 50FL, 50RR of each wheel at the front and rear sides.

After the body height is increased, the air pressure in the high pressure reservoir tanks 33, 33R is somewhat reduced thereby. Therefore, air must be added to both high pressure reservoir tanks 33, 33R from the compressed air supply exhaust system 10. In this case, both leveling valve 56 and discharge valve 58 of air suspension system are set in the OFF position and both front reservoir high pressure valve 35 and rear reservoir high pressure valve 35R are set in the ON position. The air pressurized by the pump 3 passes the non-return valve 6 and dryer 7 which eliminates the contained moisture, thereafter passes without resistance through one-way throttle valve 8, and is then supplied to the supply pipe 42 through the flow control main valve 9 which is set in the ON position. Since the supply pipe 42 is connected to the supply pipe 40 of the front wheels system 21 and the supply pipe 40 of front wheels system 21 is connected with the supply pipe 40R of rear wheels system 25 through the front-to-rear pipe 44, high pressure air is supplied from the compressed air supply exhaust system 10 through the front reservoir high pressure valve 35 and rear reservoir high pressure valve 35R to high pressure reservoir tanks 33, 33R where it accumulates. The air to be supplied to the pump 3 can be obtained also from the low pressure reservoir tanks 34, 34R, in addition to the atmospheric air as explained previously. Thereby, the necessary energy of pump 3 can be reduced and moreover the supply speed of high pressure air to the high pressure reservoir tanks 33, 33R can also be enhanced. In such a case, such a recycle circuit may also be formed in a system simplified by the supply pipe 44 and exhaust pipe 45 between the front and rear sides.

The system explained above results in the merit that even if any of the front or rear reservoir high pressure valves 35 and 35R is not set ON during adjustment of body height, adjustment can be realized because air is also supplied to the air suspension system of the other system by the supply pipe 44 between the front and rear sides.

Thus it should be understood that although a certain specific embodiment of invention has been shown and described for the purpose of illustration, it will of course be apparent that the invention is not limited to the embodiment illustrated and described, but in its broadest aspects it includes all equivalent embodiments and modifications which come within the scope of the invention.

What is claimed is:

1. A vehicle fluid suspension circuit comprising:
   high pressure fluid sources disposed respectively at front and rear sides of a vehicle;
   fluid passages disposed respectively at front and rear sides of said vehicle, said fluid passages connecting said high pressure fluid sources to fluid suspensions of left and right wheels at front and rear sides of said vehicle and having valves between said respective high pressure fluid sources and said respective fluid suspensions; and
   a front-to-rear passage connecting said high pressure fluid source at the front side of said vehicle to said high pressure fluid source at the rear side of said vehicle, the effective sectional area of said front-to-rear passage being smaller than the effective sectional areas of said fluid passages at the front and rear sides of said vehicle, respectively.

2. A vehicle fluid suspension circuit as claimed in claim 1, wherein each of said high pressure fluid sources comprises a high pressure reservoir tank reserving therein high pressure fluid which is supplied to said fluid suspensions.

3. A vehicle fluid suspension circuit comprising:
   high and low pressure fluid sources disposed at both front and rear sides of a vehicle;
   high pressure fluid passages connecting said high pressure fluid sources to fluid suspensions of left and right wheels at front and rear sides of said vehicle and having valves between said high pressure fluid sources and said fluid suspensions;
   a first front-to-rear passage connecting said high pressure fluid source at the front side of said vehicle to said high pressure fluid source at the rear side of said vehicle, the effective sectional area of said first front-to-rear passage being smaller than the effective sectional areas of said high pressure fluid passages at front and rear sides of said vehicle, respectively;
   low pressure fluid passages connecting said low pressure fluid sources to fluid suspensions of left and right wheels at front and rear sides of said vehicle and having valves between said low pressure fluid sources and said fluid suspensions, respectively; and
   a second front-to-rear passage connecting said low pressure fluid source at the front side of said vehicle to said low pressure fluid source at the rear side of said vehicle, the effective sectional area of said second front-to-rear passage being smaller than the effective sectional areas of said low pressure fluid passages at front and rear sides of said vehicle, respectively.

4. A vehicle fluid suspension circuit as claimed in claim 3, wherein said high pressure fluid sources are high pressure reservoir tanks reserving therein high pressure fluids which are supplied to said fluid suspensions at front and rear sides of said vehicle, and said low pressure fluid sources are low pressure reservoir tanks reserving therein low pressure fluids which are discharged from side fluid suspensions at front and rear sides of said vehicle.

5. A vehicle fluid suspension circuit as claimed in claim 4, wherein said high pressure reservoir tank at the front side of said vehicle is connected to an exhaust port of a pressure source via a first fluid passage and said low pressure reservoir tank at the front side of said vehicle is connected to a suction port of said pressure source via a second fluid passage.

* * * * *